United States Patent
Hagedorn

(10) Patent No.: US 10,128,912 B2
(45) Date of Patent: Nov. 13, 2018

(54) EFFICIENT NEAR FIELD COMMUNICATION (NFC) TAG DETECTION AND RELATED METHODS

(71) Applicant: BlackBerry Limited, Waterloo (CA)

(72) Inventor: J. David Hagedorn, Waterloo (CA)

(73) Assignee: BlackBerry Limited, Waterloo (CA)

(*) Notice: Subject to any disclaimer, the term of this patent is extended or adjusted under 35 U.S.C. 154(b) by 0 days.

(21) Appl. No.: 15/275,656

(22) Filed: Sep. 26, 2016

(65) Prior Publication Data

US 2018/0091193 A1   Mar. 29, 2018

(51) Int. Cl.
*H04B 5/00* (2006.01)
*H04W 4/80* (2018.01)
*G06K 7/10* (2006.01)

(52) U.S. Cl.
CPC ....... *H04B 5/0056* (2013.01); *G06K 7/10366* (2013.01); *H04W 4/80* (2018.02)

(58) Field of Classification Search
CPC .... H04B 5/0056; G06K 7/10366; H04W 4/80
See application file for complete search history.

(56) References Cited

U.S. PATENT DOCUMENTS

| | | | |
|---|---|---|---|
| 6,527,179 B1 | 3/2003 | Itoh et al. | |
| 8,929,812 B2 | 1/2015 | Gree | |
| 9,400,898 B2* | 7/2016 | Hagedorn | G06K 7/0008 |
| 9,460,323 B2* | 10/2016 | Sandell | G06K 7/10198 |
| 9,519,812 B2* | 12/2016 | Bassan-Eskenazi | G01S 11/02 |
| 9,727,763 B2* | 8/2017 | Nikitin | G06K 7/10227 |
| 9,911,290 B1* | 3/2018 | Zalewski | G07G 1/0072 |
| 2006/0202803 A1 | 9/2006 | Yoon et al. | |
| 2006/0289646 A1 | 12/2006 | Shafer | |
| 2007/0017983 A1* | 1/2007 | Frank | G06Q 10/087 235/385 |
| 2012/0161967 A1* | 6/2012 | Stern | G06Q 10/087 340/572.1 |
| 2012/0202423 A1* | 8/2012 | Tiedemann | H04W 52/0254 455/41.1 |
| 2012/0254032 A1* | 10/2012 | Carbonell Duque | G06Q 20/3278 705/44 |

(Continued)

FOREIGN PATENT DOCUMENTS

| | | |
|---|---|---|
| EP | 2574023 | 3/2013 |
| EP | 2843974 | 3/2015 |
| WO | WO2010/063611 | 6/2010 |

OTHER PUBLICATIONS

Extended European Search Report; EP17192978; dated Feb. 2, 2018.

(Continued)

*Primary Examiner* — Brian Miller
(74) *Attorney, Agent, or Firm* — Ridout and Maybee LLP

(57) ABSTRACT

The present disclosure relates to efficient near field communication (NFC) tag detection and related methods. In accordance with one example, there is provided a method of communication between a mobile wireless communications device and near field communication (NFC) tags, comprising: polling for NFC devices at a default rate; detecting an NFC tag in response to the polling at the default rate; when the detected NFC tag was previously detected a first threshold number of times within a first threshold duration, polling for NFC devices at a reduced polling rate.

20 Claims, 8 Drawing Sheets

(56) References Cited

U.S. PATENT DOCUMENTS

| | | | |
|---|---|---|---|
| 2013/0079026 A1* | 3/2013 | Hagedorn | H04W 4/027 |
| | | | 455/456.1 |
| 2014/0084060 A1* | 3/2014 | Jain | G06Q 10/087 |
| | | | 235/385 |
| 2014/0106669 A1* | 4/2014 | Krishnan | H04B 5/00 |
| | | | 455/41.1 |
| 2015/0017909 A1* | 1/2015 | Meunier | H04N 5/23229 |
| | | | 455/41.1 |
| 2015/0061839 A1 | 3/2015 | Hagedorn | |
| 2015/0220762 A1* | 8/2015 | Jiang | G06K 7/10396 |
| | | | 235/375 |

OTHER PUBLICATIONS

Announcing Sack Overflow Documentation; https://stackoverflow.com/questions/36126635/how-to-detect-nfc-tag-was-removed.

Announcing Sack Overflow Documentation—How to confirm whether there is a NFC tag exists in Android now?; http://stackoverflow.com/questions/23441430/how-to-confirm-whether-there-is-a-nfc-tag-exists-in-android-now.

Announcing Sack Overflow Documentation—Detect NFC disconnection; http://stackoverflow.corn/questions/29891414/detect-nfc-disconnection.

Announcing Sack Overflow Documentation—How to read an NFC tag which is already attached to the device; https://stackoverflow.com/questions/36981787/how-to-read-an-nfc-tag-which-is-already-attached-to-the-device.

Activate Actions upon Removal of NFC tags; http://www.xda.developers.com/activate-actions-upon-removal-of-nfc-tags/.

Lifehacker: Run an action when you remove your phone from an NFC Tag; http://lifehacker.com/run-an-action-when-you-remove-your-phone-from-an-nfc-ta-1208446359.

* cited by examiner

EFFICIENT NEAR FIELD COMMUNICATION (NFC) TAG DETECTION AND RELATED METHODS

TECHNICAL FIELD

The present disclosure relates generally to the field of communications, and more particularly to mobile wireless communications systems and related methods that use near field communication (NFC).

BACKGROUND

Wireless communications devices, such as smartphones and tablets, continue to grow in popularity and have become an integral part of both personal and business communications. Various mobile wireless communications devices now incorporate features such as email, text and instant messaging, calendars, address books, task lists, calculators, memo and writing programs, media players, games, etc. These multi-function devices usually allow email messages to be sent and received wirelessly, as well as access the internet via a cellular network and/or a wireless local area network (WLAN), for example.

Some wireless communications devices incorporate contactless card technology and/or near field communication NFC chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters. For example, U.S. Pat. No. 9,400,898 B2 discloses methods of determining whether a detected NFC tag has been previously detected.

DESCRIPTION OF EXAMPLE EMBODIMENTS

Figure 1:
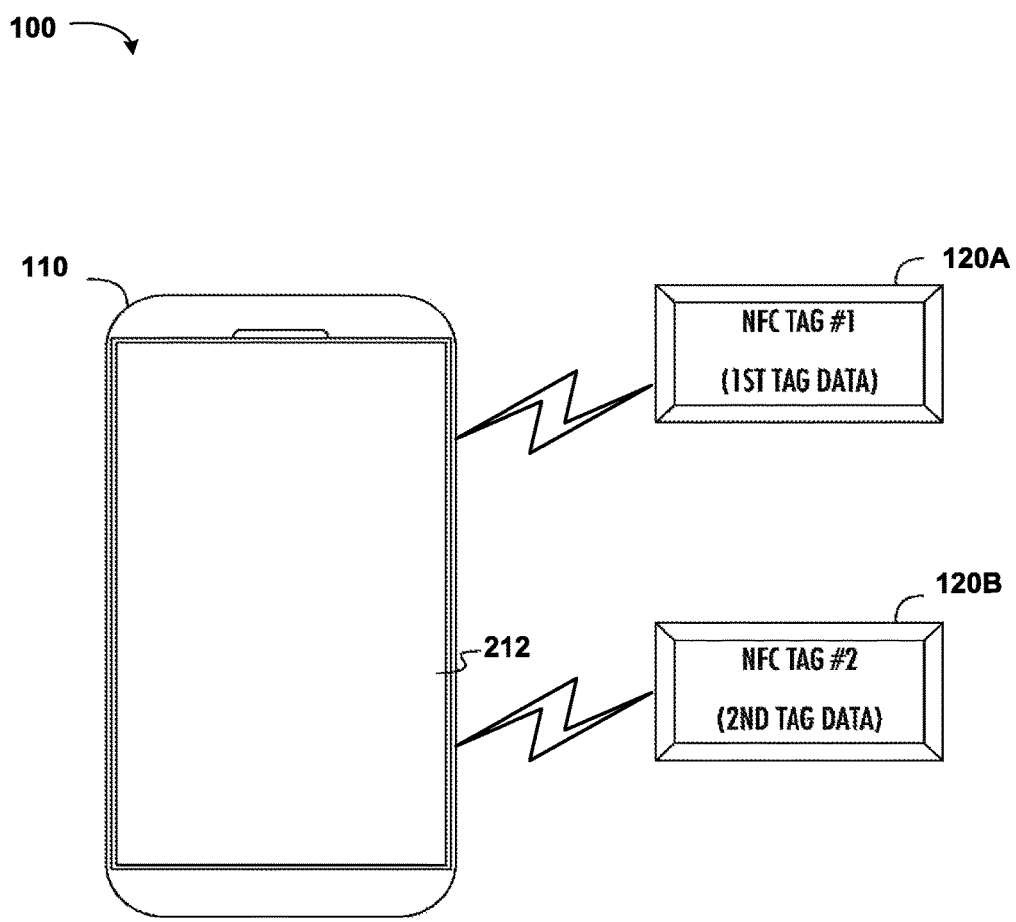
FIG. 1 is a schematic block diagram of a wireless communication system providing efficient near field communication NFC tag detection in accordance with an example embodiment of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

In accordance with an example embodiment of one aspect of the present disclosure, there is provided a method of communication between a mobile wireless communications device and near field communication NFC tags, comprising: polling for NFC devices at a default rate; detecting an NFC tag in response to the polling at the default rate; when the detected NFC tag was previously detected a first threshold number of times within a first threshold duration, polling for NFC devices at a reduced polling rate.

In some examples, the method further comprises: when the detected NFC tag is re-detected a second threshold number of times within a second threshold duration in response to polling at the reducing polling rate, polling for NFC devices at a further reduced default rate; when another NFC tag is detected in response to polling at the reducing polling rate, resuming polling for NFC devices at the default rate after interacting with the NFC tag.

In some examples, the first threshold duration and the second threshold duration are different.

In some examples, the first threshold number of times and the second threshold number of times are different.

In some examples, the method further comprises: when the detected NFC tag was previously detected a first threshold number of times within a first threshold duration, delaying the resumption of polling by a first delay, wherein polling for NFC devices at the reduced polling rate is performed after the first delay. In some examples, the method further comprises: wherein, when the detected NFC tag is re-detected a second threshold number of times within a second threshold duration, delaying the resumption of polling by a second delay, wherein polling for NFC devices at the further reduced polling rate is performed after the second delay. In some examples, the first delay and the second delay are different.

In some examples, the method comprises, when another NFC tag is detected, resuming polling for NFC devices without delay after interacting with the NFC tag.

In some examples, the reduced polling rate is less than the default polling rate, and the further reduced polling rate is less than the reduced polling rate.

In some examples, the first threshold number of times and the second threshold number of times is once.

In some examples, the method further comprises: when the detected NFC tag was previously detected within the first threshold duration, changing the value of a polling rate stored in a memory of the mobile wireless communications device from the default polling rate to a reduced polling rate; when the detected NFC tag is re-detected a second threshold number of times within a second threshold duration, changing the value of the polling rate stored in the memory of the mobile wireless communications device from the reduced polling rate to the further reduced polling rate.

In some examples, the method further comprises: determining based on data received from the detected NFC tag whether the detected NFC tag corresponds to a previously detected NFC tag.

In some examples, the method further comprises: when the detected NFC tag continues to be detected and the current polling rate is greater than a minimum polling rate, polling for NFC devices at a progressively lower polling rates at periodic intervals until the minimum polling rate is reached.

In accordance with another example embodiment of one aspect of the present disclosure, there is provided a method of communication between a mobile wireless communications device and near field communication (NFC) tags, comprising: polling for NFC devices; and progressively reducing the polling rate from a default polling rate to a minimum rate at periodic intervals when an NFC tag is repeatedly redetected until a new NFC tag is detected.

In accordance with a further example embodiment of one aspect of the present disclosure, there is provided a method of communication between a mobile wireless communications device and near field communication NFC tags, comprising: polling for NFC devices; detecting an NFC tag in response to the polling; interacting with the NFC tag; deactivating the NFC tag after interacting with the NFC tag; resuming polling for NFC devices; and progressively reducing the polling rate from a default polling rate to a minimum rate at periodic intervals when the detected NFC tag is repeatedly redetected within a first threshold duration until a new NFC tag is detected.

In accordance with a further example embodiment of one aspect of the present disclosure, there is provided a method of communication between a mobile wireless communications device and near field communication NFC tags, comprising: polling for NFC devices at a default rate; detecting an NFC tag in response to the polling; when the detected NFC tag was previously detected a first threshold number of times within a first threshold duration: delaying the resumption of polling by a first delay; and resuming polling for NFC devices after the first delay.

In some examples, the method further comprises: when the detected NFC tag is re-detected a second threshold number of times within a second threshold duration, delaying the resumption of polling by a second delay and resuming polling for NFC devices after the second delay; when another NFC tag is detected, resuming polling for NFC devices without delay after interacting with the NFC tag.

In accordance with yet a further example embodiment of one aspect of the present disclosure, there is provided a method of operating a mobile wireless communications device, comprising: polling for NFC devices; detecting an NFC tag in response to the polling; reading data from the NFC tag; performing a first action in response to the reading in accordance with the data read from the NFC tag; deactivating the NFC tag; resuming polling for NFC devices; detecting a loss of the NFC tag when the NFC tag is not detected in response to the polling; and performing a second action in response to detecting the loss of the NFC tag.

In some examples, when resuming polling for NFC devices, the polling is only performed for the NFC technology of the last detected NFC tag.

In some examples, after resuming polling for the NFC devices, the polling continues while the mobile wireless communications device is in a low power mode.

In some examples, the method further comprises: after resuming polling, initiating a low power mode in response to detecting a trigger for the low power mode; wherein the polling continues while the mobile wireless communications device is in the low power mode.

In some examples, entering the low power mode comprises deactivating a backlight of a display of the mobile wireless communication device.

In some examples, the first action comprises initiating a designated operating mode of the mobile wireless communications device and the second action comprise terminating the designated operating mode of the mobile wireless communications device.

In some examples, the designated operating mode is a bedside mode in which all audible and/or haptic notifications are disabled.

In some examples, the designated operating mode is a bedside mode in which all audible and/or haptic notifications are disabled except for any designated alarms.

In some examples, the designated operating mode is a bedside mode in which all notifications are disabled except for any designated alarms.

In some examples, the method further comprises: when the detected NFC tag has been previously detected a first threshold number of times within a first threshold duration, reducing a polling rate from a default rate to a reduced pilling rate, and resuming polling for NFC devices at the reduced polling rate. In some examples, the method further comprises: resuming polling for NFC devices at a default polling rate in response to detecting movement of the mobile wireless communications device.

In accordance with yet a further example embodiment of one aspect of the present disclosure, there is provided a method of communication between a mobile wireless communications device and near field communication NFC tags, comprising: deactivating an NFC tag after interacting with the NFC tag; resuming polling for NFC devices; detecting a loss of the NFC tag when the NFC tag is not detected in response to the polling; and performing an action in response to detecting the loss of the NFC tag.

In accordance with an example embodiment of another aspect of the present disclosure, there is provided a mobile wireless communications device, comprising: a processor; an NFC subsystem for communicating with NFC devices; and a memory having stored thereon executable instructions that, when executed by the processor, configure the processor to perform one or more of the methods described herein.

In accordance with an example embodiment of a further aspect of the present disclosure, there is provided a non-transitory machine readable medium having tangibly stored thereon executable instructions that, when executed by a processor of a mobile wireless communications device, cause the processor to perform one or more of the methods described herein.

In accordance with an example embodiment of yet a further aspect of the present disclosure, there is provided a communication system comprising: a mobile wireless communications device as described herein; and one or more NFC tags, each comprising a memory having stored thereon data and optionally executable instructions which are readable by the mobile wireless communications device during interaction (e.g., data exchange/reading) therewith.

FIG. 1 illustrates a wireless communication system 100 according to the present disclosure comprising an NFC-enabled mobile wireless communications device 110 and a plurality of NFC tags 120, two of which are shown in FIG. 1, represented individually by references 120A and 120B. The mobile wireless communications device 110 and NFC tags each comprise an NFC subsystem, which in the case of the mobile wireless communications device 110 is similar to an NFC reader. By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of between 0 to 20 centimeters, typically about 10 cm, but other suitable versions of near-field communication which may have different operating frequencies, effective ranges, etc., for example, may also be used.

When the mobile wireless communications device 110 is brought within close proximity of an NFC tag 120, an NFC communication link (or connection) is established between the mobile wireless communications device 110 and the NFC tag 120 using the NFC communication protocol. The mobile wireless communications device 110 and NFC tag 120 can then communicate and exchange data with each other using the NFC communication protocol. For example, the mobile wireless communications device 110 may read data stored on the NFC tag 120.

NFC technology is an extension of the ISO 14443 proximity-card standard as a contactless card, RFID standard that incorporates the interface of a smart card and a reader into one device. The NFC subsystem of the mobile wireless communications device 110 typically comprises an NFC integrated circuit (IC) chip that communicates with other NFC-enabled devices such as existing ISO 14443 smart cards and readers and other NFC devices, and is compatible with existing contactless infrastructures. The NFC IC chips use magnetic field induction in which two loop antennas are located near each other and form an air-core transformer.

There are two primary modes of NFC operation: an active mode and a passive mode. In the active mode, both the NFC devices have a dedicated power supply and generate their own electromagnetic field. In the passive mode, at least one of the NFC devices has its own power supply while the other will derive its power from the other actively powered NFC device. Typically, NFC devices operate in the active mode using a modified Miller and 100% amplitude shift keyed (ASK) code and operate in the passive mode using a Manchester and ASK code. Further details are set forth in the Mobile NFC Technical Guidelines, Version 2.0, November 2007 by GSMA, the disclosure of which is hereby incorporated by reference in its entirety.

The "Near Field Communications Interface and Protocol" or "NFCIP-1" or "the NFC protocol" allows for communication between an initiator device and a target device, when the initiator device and the target device are brought close together. In the wireless communication system of FIG. 1, the mobile wireless communications device is typically the initiator device and the NFC tag 120 is the target device and operates in the passive mode. Detailed information about NFCIP-1 is available in a published standard called ECMA-340, which is available from Ecma International at www.ecma-international.org, the disclosure of which is hereby incorporated by reference in its entirety.

The NFC protocol operates within the globally available and unregulated radio frequency band of 13.56 MHz and has a working distance of up to 20 centimeters. Three data rates are typically available: 106 kilobits per second (kbit/s), 212 kbit/s, and 424 kbit/s. As noted above, multiple modes of communication are available. In the passive communication mode, the initiator device provides an electromagnetic carrier field and the target device answers the initiator device by modulating the carrier field. In the passive communication mode, the target device may draw operating power from the carrier field provided by the initiator device. Advantageously, only the initiator device is required to have a power supply. The modulating magnetic field created by the target device could be used for communicating a limited amount of data.

In the active communication mode, both the initiator device and the target device generate their own electromagnetic field. The initiator device starts the NFCIP-1 communication. The target device can respond to a command received from the initiator device in the active communication mode by modulating the electromagnetic field generated by the target device. In the active communication mode, both devices require a power supply. In the passive communication mode, the NFC-enabled device that derives its power from the actively powered NFC device and does not generate its electromagnetic carrier field, such as the NFC tag 120, does not require a dedicated power supply although it could have one. An NFC device that cannot generate its electromagnetic carrier field cannot be an initiator device and instead can only be the target device.

The mobile wireless communications device 110 may be, but is not limited to, a mobile (or cellular) telephone, smartphone, tablet computer, portable or personal media player (e.g., music or MP3 players, video players, etc.), wireless organizer or personal digital assistant (PDA), portable gaming device or smartwatch.

The NFC tags 120 comprise an NFC controller, an antenna and a persistent memory. The NFC tags 120 are small and relatively inexpensive and may be integrated into many different types of products including, but not limited to, smart cards (e.g. keycards and ID cards), stickers or labels, flyers or brochures, wristbands, business cards, posters, ski lift passes or even prescription bottles. Generally, an NFC tag ranges in size from 1 or 2 centimeter to a few inches. Blank NFC tags can be obtained and written with data for a variety of purposes and applications.

The NFC tags 120 are typically passive and lack a dedicated power source. Instead, the NFC tags 120 draw power from the mobile wireless communications device 110 using magnetic induction when the NFC tags 120 are read by the mobile wireless communications device 110. When the mobile wireless communications device 110 gets close enough to an NFC tag 120, it energizes it and reads data from the NFC tag 120.

There are different types of NFC tags, different signaling technologies (e.g., NFC-A, NFC-B, and NFC-F) and different modes of operation that certain NFC compatible devices can undertake. The most common types of NFC tags are Type 1, Type 2, Type 3 and Type 4, each having different capacities and data transfer speeds. Type 1 NFC tags use NFC-A communication without data collision protection, store 96 bytes and operate at 106 kbps. Type 2 NFC tags use NFC-B and Type 3 tags use NFC-F, both with anti-collision. Type 4 NFC tags can use either NFC-A or NFC-B with anti-collision, and can store up to 32 kB of data and operate at speeds of up to 424 kbps. Type 1 and Type 2 tags can be written to multiple times, and can be write-protected and/or encrypted, so that the data stored thereon cannot be manipulated. Type 3 and Type 4 tags can only be written to once and lack the security of Types 1 and 2. NFC tags with more memory and larger antennas are bigger in physical size.

Figure 2:
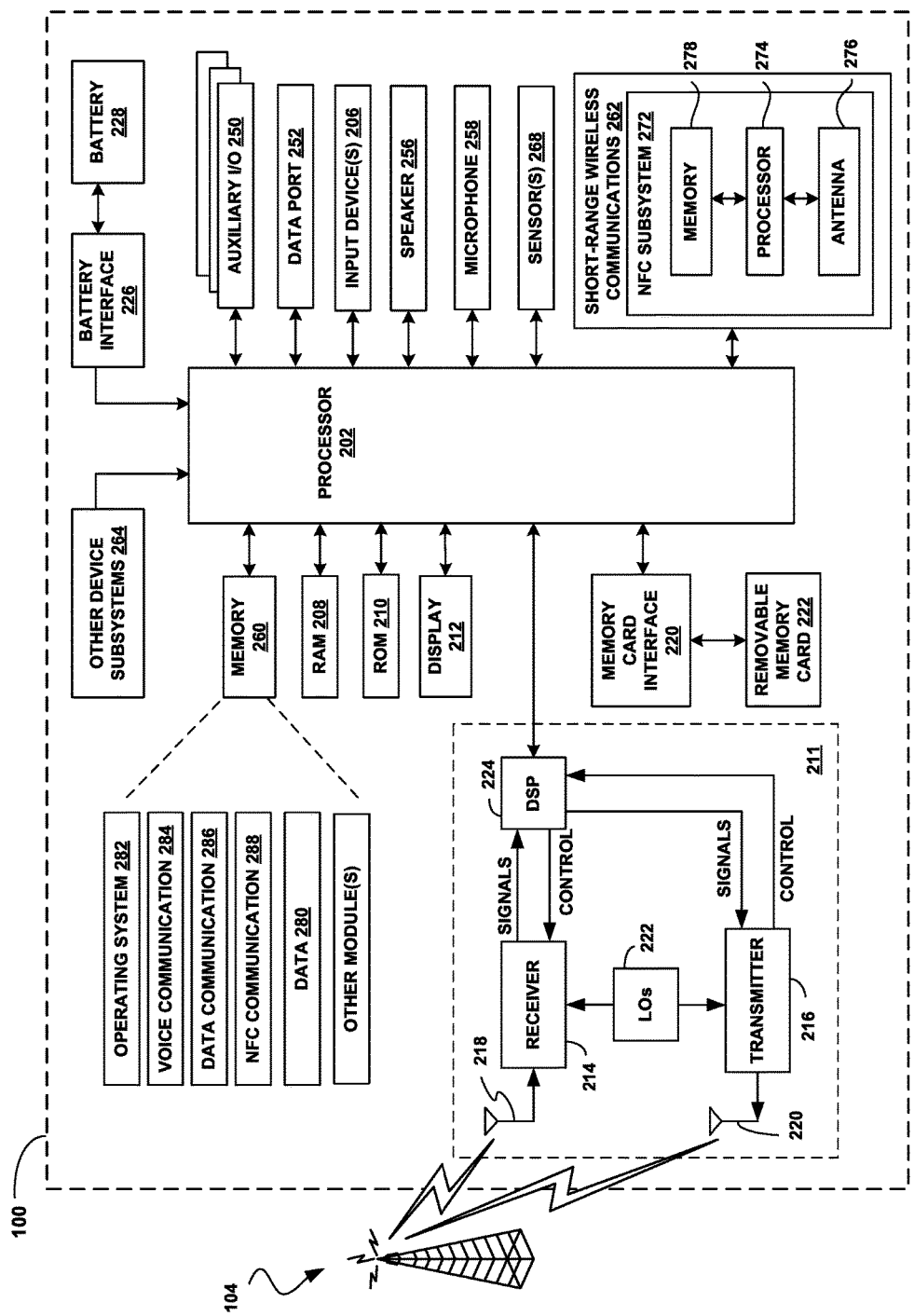
FIG. 2 is a schematic block diagram illustrating example components of a mobile wireless communications device that may be used in the wireless communication system of FIG. 1.

FIG. 2 illustrates example components of an example mobile wireless communications device 110 that may be used in the system of FIG. 1 in accordance with the embodiments. The device 110 illustratively includes a rigid case or housing (not shown) which carries the electronic components of the device 110. The housing may be elongated vertically, or may take on other sizes and shapes (including clamshell housing structures). The device 110 includes a controller comprising at least one processor 202 (such as a microprocessor) which controls the overall operation of the device 110.

The processor 202 interacts with other components, such as input device(s) 206, Random Access Memory (RAM) 208, Read Only Memory (ROM) 210, wireless communications subsystem 211 for exchanging radio frequency signals with a wireless network 104, a display 212 such as a color liquid crystal display (LCD) or active-matrix organic light-emitting diode (AMOLED) display, persistent (non-volatile) memory 260 which may be flash erasable programmable read only memory (EPROM) memory (flash memory) or other suitable form of memory, sensor(s) 268 such as a motion sensor, an orientation sensor and/or proximity sensor, auxiliary input/output (I/O) subsystems 250, data port 252 such as serial data port (e.g., Universal Serial Bus (USB) data port), speaker 256, microphone 258, a short-range communications subsystem 262, and other device subsystems 264 such as a camera, global positioning system (GPS), vibrator or light-emitting diode (LED) notification light. The components of the device 110 are coupled via a communications bus (not shown) which provides a communication path between the various components.

The input device(s) 206 may include a keyboard or keypad, one or more buttons, one or more switches, a touchpad, a rocker switch, a thumbwheel, or other type of input device. In addition to or instead of a keyboard or keypad, the display 212 may be provided as part of a touchscreen or touch-sensitive display which provides an input device 206. The display 212 which together with a touch-sensitive overlay (not shown) operably coupled to an electronic controller (not shown) may comprise the touch-sensitive display. The touch-sensitive display is typically a capacitive touch-sensitive display which includes a capacitive touch-sensitive overlay.

User-interaction with a graphical user interface (GUI) presented on the display 212 is performed using the input devices 206. Information, such as text, characters, symbols, images, icons, and other items are rendered and displayed on the display 212 via the processor 202. The processor 202 may interact with one or more sensors 268, such as the orientation sensor to detect direction of gravitational forces or gravity-induced reaction forces so as to determine, for example, the orientation of the device 110 in order to determine a screen orientation for the GUI.

Operating system software 282 executed by the processor 202 is stored in the persistent memory 260, such as flash memory, but may be stored in other types of memory devices, such as ROM 210 or similar storage element. User data 280 is also stored in the persistent memory 260. System software, software modules, specific device applications, or parts thereof, may be temporarily loaded into a volatile store, such as RAM 208, which is used for storing runtime data variables and other types of data or information. Communications signals received by the device 110 may also be stored in the RAM 208. Although specific functions are described for various types of memory, this is merely one example, and a different assignment of functions to types of memory could also be used.

The processor 202, in addition to its operating system functions, enables execution of software applications on the device 110. A predetermined set of applications or software modules that control basic device operations, such as voice communications module 284, data communications module 286, NFC communications module 288, may be installed on the device 110 during manufacture. The NFC communications module 288, when executed by the processor 202, causes the operations of the below-described methods to be performed.

A personal information manager (PIM) application may be installed during manufacture. The PIM may be capable of organizing and managing data items, such as email, calendar events, voice mails, appointments, and task items. The PIM application may also be capable of sending and receiving data items via the wireless network 104. The PIM data items may be seamlessly integrated, synchronized and updated via the wireless network 104 with corresponding data items stored or associated with a host computer system. New applications and updates to installed applications may be installed by the user, for example, via the Internet.

The device 110 is a two-way wireless Radio Frequency (RF) communications device having data and/or voice communications capabilities. In addition, the device 110 may have the capability to communicate with other computer systems via the Internet. The wireless communication subsystem 211 exchanges radio frequency signals with the wireless network 104. The wireless communication subsystem 211 comprises a wireless Wide Area Network (WAN) communication subsystem for two-way communication with a wireless WAN, such as a cellular network. The device 110 may communicate with any one of a plurality of fixed transceiver base stations (not shown) of the wireless network 104 within its geographic coverage area. The device 110 may send and receive communication signals over the wireless network 104 after the required network registration or activation procedures have been completed. In addition, the wireless communication subsystem 211 may comprise a Wireless Local Area Network (WLAN) communication subsystem for two-way communication with a WLAN via wireless access points (not shown), e.g. Wi-Fi™.

Communication functions, including data and voice communications, are performed through the communications subsystem 211 and possibly through the short-range communications subsystem 262 (e.g., using the NFC subsystem 272). Data received by the device 110 may be decompressed and decrypted by a decoder (not shown). The communications subsystem 211 includes a receiver 218, a transmitter 216, and one or more antennas 218 and 220. In addition, the communications subsystem 211 also includes a processor, such as a digital signal processor (DSP) 224, and local oscillators (LOs) 222. The specific design and implementation of the communications subsystem 211 is dependent upon the wireless communications network(s) 104 in which the device 110 is intended to operate. For example, the device 110 may include a communications subsystem 211 designed to operate with the Mobitex™, Data TAC™ or General Packet Radio Service (GPRS) mobile data communications networks, and also designed to operate with any of a variety of voice communications networks, such as Advanced Mobile Phone System (AMPS), time division multiple access (TDMA), Code Division Multiple Access (CDMA), Wideband code division multiple access (W-CDMA), Personal Communications Service (PCS), GSM (Global System for Mobile Communications), Cellular Digital Packet Data (CDPD), integrated Digital Enhanced Network (iDEN), High-Speed Downlink Packet Access (HSPDA), Evolution-Data Optimized (EvDO), Enhanced Data rates for GSM Evolution (EDGE), etc. Other types of data and voice networks, both separate and integrated, may also be utilized with the device 110. The device 110 may also be compliant with other communications standards such as 3GSM, 3rd Generation Partnership Project (3GPP), Universal Mobile Telecommunications System (UMTS), 4G, etc.

Network access requirements vary depending upon the type of communication system. For example, in GPRS networks, network access is associated with a subscriber or user of a device. The device 110 also includes a memory card interface 220 for receiving a removable memory card 222 comprising persistent memory, such as flash memory, having subscriber identity data stored thereon. The memory card 222 can be inserted in or coupled to the memory card interface 220 for storing and reading data by the processor 202.

When required network registration or activation procedures have been completed, the mobile device 110 may send and receive communications signals over the communication network 104. Signals received by the antenna 218 through the wireless network 104 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network 104 via the antenna 220.

In addition to processing communications signals, the DSP 224 provides for control of the receiver 214 and the transmitter 216. For example, the gains applied to communication signals in the receiver 214 and the transmitter 216 may be adaptively controlled through automatic gain control algorithms implemented in the DSP 224.

In a data communications mode, a received signal, such as a text message or web page download, is processed by the communications subsystem 211 and is input to the processor 202. The received signal is then further processed by the processor 202 for an output to the display 212, or alternatively to some other auxiliary I/O device 250. The device 110 may also be used to compose data items, such as email messages, using the input device(s) 206 and/or some other auxiliary I/O device 250. The composed data items may then be transmitted over the communications network 104 via the communications subsystem 211.

In a voice communications mode, overall operation of the device is substantially similar to the data communications mode, except that received signals are output to a speaker 256, and signals for transmission are generated by a microphone 258. Alternative voice or audio I/O subsystems, such as a voice message recording subsystem, may also be implemented on the device 110. In addition, the display 212 may also be utilized in voice communications mode, for example to display the identity of a calling party, the duration of a voice call, or other voice call related information.

The short-range communications subsystem 262 enables communication between the device 110 and other proximate systems or devices, which need not necessarily be similar devices. The short-range communications subsystem 262 includes an NFC subsystem 272 for communicating with another mobile wireless communications device via NFC communications. The NFC subsystem 272 may also be used for communicating with an NFC device or NFC tag via NFC communications.

The NFC communications module 288 as a software module cooperates with the processor 202 through the persistent memory 260. The NFC subsystem 272 includes a processor 274, an antenna 276 that communicates with another NFC-enabled mobile wireless communications device or NFC tag, and a persistent memory 278. The NFC communications module 288 allows the processor 202 to control the NFC subsystem 272. The antenna 276 is tuned typically for 13.56 MHz. The persistent memory 278 is used to store the subscriber identity data, the shared secret for accessing the subscriber identity data, and possibly other data. As noted above, the subscriber identity data and the shared secret for accessing the subscriber identity data may be stored in encrypted form. The NFC subsystem 272 is configured for operating in either an active communication mode or a passive communication mode, as described above.

The processor 274 could be, for example, a PN531 microcontroller-based transmission module from the Phillips Semiconductor Branch of Koninklijke Phillips Electronics N.V. When the NFC controller is a PN531 module, the processor 274 could include analog circuitry and a contact list Universal Asynchronous Receiver Transmitter (UART), a core and a set of host interfaces. The analog circuitry could include an output driver, an integrated demodulator, a bit decoder, a mode detector and an RF-level detector. The contact list UART could include elements for data processing, Cyclical Redundancy Checking (CRC), parity generation, framing generation and check bit coding and decoding. The core typically includes an 80051 microcontroller, 32 Kbyte of ROM and one Kbyte of RAM. A set of host interfaces can interface with the microprocessor and interface according to such known standards as I2C, serial UART, SPI and USB.

The short-range communications subsystem 262 may also include devices, associated circuits and components for providing other types of short-range wireless communication such as Bluetooth™, IEEE 802.11, IEEE 802.15.3a (also referred to as UltraWideband (UWB)), Z-Wave, ZigBee, or infrared such as an Infrared Data Association (IrDA) communications, as well as a corresponding communications module in persistent memory 260 to provide for communication with similarly-enabled systems and devices.

The device 110 also includes a battery 228 as a power source, which is typically one or more rechargeable batteries that may be charged, for example, through charging circuitry coupled to a battery interface such as the serial data port 252. The battery 228 provides electrical power to at least some of the components of the device 110, and the battery interface 226 provides a mechanical and electrical connection for the battery 228. The battery interface 226 is coupled to a regulator (not shown) which provides power V+ to the circuitry of the device 110.

Figure 3:
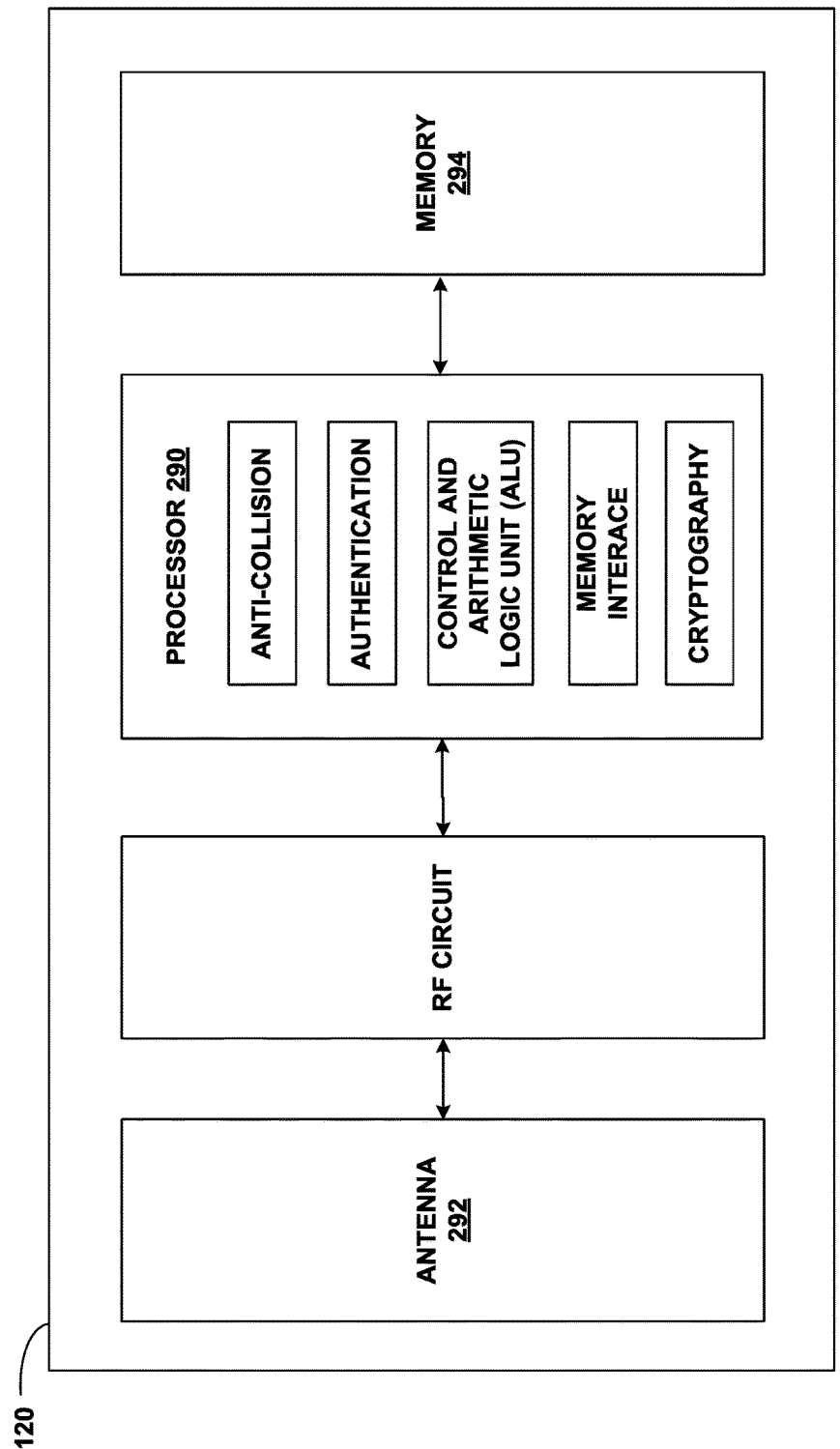
FIG. 3 is a schematic block diagram illustrating example components of an NFC tag that may be used in the wireless communication system of FIG. 1.

FIG. 3 is a schematic block diagram illustrating example components of an NFC tag 120 that may be used in the system of FIG. 1 in accordance with the embodiments. The NFC tag 120 comprises a processor 290, an antenna 292 and a persistent memory 294, such as Electrically Erasable Programmable Read-Only Memory (EEPROM). The processor 290 comprises a control and arithmetic logic unit (ALU), memory interface, and RF interface circuit. The processor 290 may perform anti-collision, authentication and cryptographic functions depending on the type of the NFC tag 120. The anti-collision, authentication and cryptographic functions may be stored in firmware on built-in memory of the processor 290.

Figure 4A:
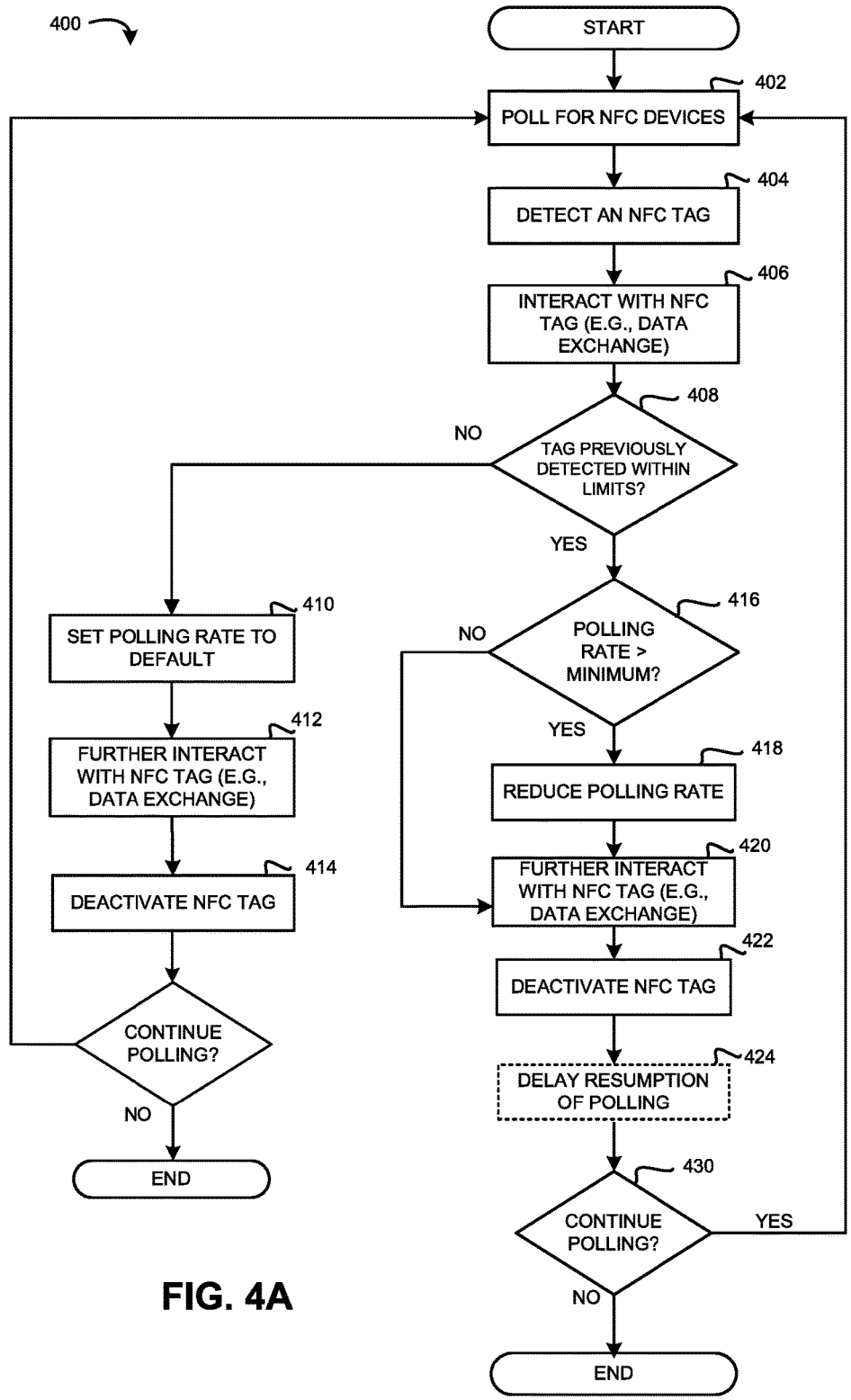
FIGS. 4A, 4B and 5 are flowcharts illustrating a method of efficient tag detection that may be used in the wireless communication system of FIG. 1 in accordance with example embodiments of the present disclosure.

FIG. 4A illustrates a flowchart of a method 400 of efficient tag detection that may be used in the wireless communication system of FIG. 1 in accordance with an example embodiment of the present disclosure. As a preliminary step (not shown), the mobile wireless communications device 110 enters a polling mode in which it attempts to detect NFC devices in the operating field of the mobile wireless communications device 110. The mobile wireless communications device 110 may enter the polling mode in response to received user input (e.g., such as input enabling NFC communications), occurrence of a new event (e.g., such as new event within an NFC-enabled application) or stating/invoking an NFC-enabled application, among many possibilities. In some examples, the mobile wireless communications device 110 may be in the polling mode whenever NFC communications are enabled and the mobile wireless communications device 110 is in a full power mode (e.g., normal operating mode). In other words, the mobile wireless communications device 110 may be in the polling mode whenever NFC communications are enabled except for when the mobile wireless communications device 110 is in a low power mode (e.g., power saving mode or sleep mode) and/or locked mode. In some examples, the mobile wireless communications device 110 is always polling while backlight of the display 212 remains activate in case the user taps an NFC tag 120 or another NFC-enabled mobile wireless communications device, etc.

At 402, the mobile wireless communications device 110 commences polling for NFC devices in the operating field of the mobile wireless communications device 110, for example, by periodically sending a polling request frame via the NFC subsystem 272. The mobile wireless communication device 110 initially polls for NFC devices at a default rate, for example, every 10 times per seconds. When in the operating field of the mobile wireless communications device 110, an NFC tag 120 will derive power from the mobile wireless communications device 110 and enter a listen mode in which the NFC tag 120 listens for and responds to polling request frames by sending polling response frames. The particular type and content of the polling commands send by the NFC subsystem 272 depends on the capabilities of the NFC subsystem 272. For example, when the NFC subsystem 272 is compliant with NFC Forum™ specifications, the mobile wireless communications device 110 may poll for NFC devices using one or any number of different NFC signaling technologies such as NFC-A, NFC-B, NFC-F and Proprietary Technology to detect NFC tags 120 using those signaling technologies. For example, an ALL_REQ or SENS_REQ command may be sent to detect NFC devices using NFC-A, an ALLB_REQ or SENSB_REQ command may sent to detect NFC devices using NFC-B, and a SENSF_REQ command may be sent to detect NFC devices using for NFC-F.

As noted above, any NFC tags 120 in the operating field of the mobile wireless communications device 110 respond to the polling request frame with a polling response frame including an NFCID (NFC Identification) using the corresponding polling response frame based on the signaling technology used by the NFC tag 120. For example, a SENS_RES command may be sent by an NFC tag using NFC-A, an SENSB_RES may be sent by an NFC tag 120 using NFC-B, and a SENSF_RES command may be sent by an NFC tag using NFC-F.

At 404, the mobile wireless communications device 110 detects an NFC tag 120 when a polling response frame is received. The mobile wireless communications device 110 and the NFC tag 120 operate in the passive communication mode with the mobile wireless communications device 110 acting as the initiator and the NFC tag 120 as the target. When more than one tag is in the operating filed, radio frequency collision avoidance (RFCA) operations may be performed using the NFCID. RFCA operations are well known and will not be described herein.

At 406, after RFCA operations are performed, the mobile wireless communications device 110 interacts with the detected NFC tags 120 using the modulation scheme, bit-level encoding, bit rate, and other parameters associated with the signaling technology of the detected NFC tags 120. The mobile wireless communication device 110 typically communicates with more than one NFC tag 120 using different time slots allocated to the detected NFC tags 120. Typically, the data exchange typically involves transferring data stored on the NFC tag 120 to the mobile wireless communications device 110, i.e. the mobile wireless communications device 110 reading data (e.g., NDEF messages or content) from the detected NFC tags 120. However, it is contemplated that the mobile wireless communications device 110 may act as an NFC writer and transfer data (e.g., NDEF messages or content) to detected NFC tags 120 for storing thereon or sending proprietary commands to proprietary tags (custom application). The interaction may comprise one or several data/command exchanges.

The particular type and content of the data received from the NFC tags 120 may be specific to the application of the NFC tags 120. The NFC tag data may comprise, for example, information related to a product, such as an item of clothing or food product which can be purchased by a user of the mobile wireless communications device 110 and/or recorded as an inventory item or a service such as an entertainment event (e.g., movie or concert). The NFC tag data may be stored on the respective NFC tags 120 at a factory and/or when the NFC tags 120 are programmed and/or provisioned, for example using an NFC reader such as the mobile wireless communications device 110. The NFC tag data may include comprises code or data, which when read by the mobile wireless communications device 110, causes the mobile wireless communications device 110 to perform one or more actions, such as initiating a bedside mode as described more fully below. The code or data may be interpreted by software on the mobile wireless communications device 110 such as, for example, an active application on the mobile wireless communications device 110.

The NFC tag data is typically formatted in accordance with NFC Data Exchange Format (NDEF)—a standardised data format used to exchange information between compatible an NFC-enabled device and another NFC-enabled device or NFC tag. The data received from the NFC tags 120, in some embodiments, includes an NFC tag identifier (ID). The NFC tag ID generally comprises data which identifies the respective NFC tag 120. The NFC tag ID may uniquely identify, for example, by providing a globally unique ID, or almost uniquely identify the respective NFC tag 120. NFC tag ID may be stored on the respective NFC tag 120 at a factory and/or when the NFC tag 120 is programmed and/or provisioned. The NFC tag ID may be generated using an algorithm for generating NFC tag IDs. While it is contemplated that in some examples not every NFC tag ID may be unique, algorithms may be used that generally attempt to avoid NFC tag ID collisions to reduce the likelihood of generating the same NFC tag ID more than once.

The processor 202 receives NFC tag IDs and optionally other data and stores the NFC tag IDs in association with a time of receipt, for example as determined from a clock of the processor 202 and/or a clock device in memory, such as the memory 278 of the NFC subsystem or possibly the main memory 260 of the mobile wireless communications device 110. The processor 202 may optionally delete older NFC tag identifiers from memory so that only a last received NFC tag ID is stored in memory and along with a respective time of receipt. Alternatively, the processor 202 may store a given number of most recently received NFC tag identifiers.

For convenience, further operations will be described with respect to a single NFC tag. However, it is contemplated that the operations described herein could be applied to multiple NFC tags.

At 408, the mobile wireless communications device 110 determines whether a detected NFC tag 120 has been previously detected a threshold number of times within a first threshold duration. In some examples, the first threshold duration may be no more than about 2 seconds, and may be between about 0.5 seconds and about 2 seconds. In one example, the first threshold duration is about 1 second. In general, the first threshold duration can comprise a few interrogation cycles of the NFC subsystem 272, i.e. an amount of time the NFC subsystem 272 takes to interrogate and/or read data from an NFC tag 120.

Methods of determining whether a detected NFC tag has been previously detected are described in U.S. patent application Ser. No. 14/014,620, filed Aug. 30, 2013, which issued as U.S. Pat. No. 9,400,898 in Jul. 26, 2016, the content of both of these documents being incorporated herein by reference. For example, the mobile wireless communications device 110 may compare NFC tag IDs when such IDs are globally unique. Alternatively, the mobile wireless communications device 110 may compare NFC tag IDs and a detection time associated therewith such that when the same NFC tag ID is detected within a given time period, it is inferred that the NFC tag IDs are associated with a single NFC tag and therefore the detected NFC tag has been previously detected.

In some examples, when an NFC tag 120 is detected in response to the polling at the default rate, the mobile wireless communications device 110 determines whether a detected NFC tag 120 has been previously detected a threshold number of times within a first threshold duration.

At 410, when it is determined that the detected NFC tag 120 has not been previously detected a first threshold number of times within the first threshold duration, the mobile wireless communications device 110 sets (or resets) the polling rate to the default rate. When the mobile wireless communications device 110 was polling at a reducing polling rate, setting the polling rate to the default rate typically comprises changing the value of a polling rate stored in a memory (e.g., the memory 278 of the NFC subsystem 272 or possibly the memory 260) of the mobile wireless communications device 110 from the reduced polling rate to the default polling rate.

At 412, the mobile wireless communications device 110 may continue to interact with the detected NFC tag 120, for example, further data may be exchanged between the mobile wireless communications device 110 and the NFC tag 120. For example, the initial data exchange may involve the mobile wireless communications device 110 reading the NFC tag ID from the detected NFC tag and optionally other data. After determining whether the detected NFC tag 120 has been previously detected, the mobile wireless communications device 110 may further interact with the detected NFC tag. The nature of the further interaction may be dependent on whether the mobile wireless communications device 110 determines that the detected NFC tag 120 has been previously detected within the first threshold duration.

At 414, after the mobile wireless communications device 110 has finished interacting with the detected NFC tag 120, the NFC tag 120 is deactivated, for example, by sending a release request command (e.g., RSL_REQ command) from the mobile wireless communications device 110 to the respective NFC tag 120. The deactivation may be completed by the respective NFC tag 120, for example, by sending a release response command (e.g., RSL_RES command) to the mobile wireless communications device 110.

When polling operations are to be continued (block 408), the mobile wireless communications device 110 resumes periodically polling for NFC devices without delay after interacting with and deactivating the NFC tag 120.

Returning to 408, when it is determined that the detected NFC tag 120 has been previously detected a first threshold number of times within the first threshold duration, the mobile wireless communications device 110 may continue to interact with the detected NFC tag 120 as noted above.

At 416, the mobile wireless communications device 110 determines whether the current polling rate is greater than or equal to a minimum polling rate. The minimum polling rate may be a minimum set by an applicable NFC standard or specification and/or a minimum that has been determined to have minimal impact on the responsiveness of the user interface of mobile wireless communications device, thereby limiting adverse impacts from a lower polling rate from a user experience perspective. In some examples, the minimum polling rate is two times per second (every 500 ms).

At 418, when the current polling rate is greater than a minimum polling rate, the polling rate is reduced by a predetermined amount. For example, the polling rate may be reduced from the default polling rate to a reduced polling rate, for example, once every 4-5 seconds. Reducing the polling rate typically comprises changing the value of a polling rate stored in a memory (e.g., the memory 278 of the NFC subsystem 272 or possibly the memory 260) of the mobile wireless communications device 110 from the default polling rate to the reduced polling rate.

At 420, after the polling rate is reduced or when the current polling rate is not greater than a minimum polling rate (e.g., when the current polling is equal to the minimum polling rate), the mobile wireless communications device 110 may continue to interact with the detected NFC tag 120

At 422, after the mobile wireless communications device 110 has finished interacting with the detected NFC tag 120, the NFC tag 120 is deactivated.

At 424, the mobile wireless communications device 110 may optionally delay the resumption of polling by a first delay, for example, by a few seconds.

At 430, the mobile wireless communications device 110 may implicitly or explicitly determine whether polling should continue, for example, because the NFC mode on the mobile wireless communications device 110 is still active. This may be part of a background process, for example, of the operating system 280 rather than the NFC communication module 288. When it is determined to continue polling, the operations return to 402 at which the mobile wireless communications device 110 resumes polling for NFC technologies. When it is determined not to continue polling, the operations end.

In some examples, when the mobile wireless communications device 110 resumes polling at the reduced polling rate, the thresholds used in 408 may be different. For example, the mobile wireless communications device 110 may determine whether the detected NFC tag 120 has been previously detected a second threshold number of times within a second threshold duration, wherein the second threshold number of times is larger than the first threshold number of times, the second threshold duration is larger than the first second threshold duration, or both. This allows more stringent thresholds to be applied, i.e. more re-detections to have occurred, before further reducing the polling rate. This provides power savings while limiting any adverse impact on the responsiveness of the mobile wireless communications device 110.

When the detected NFC tag 120 is re-detected a second threshold number of times within a second threshold duration in response to polling at the reducing polling rate, the polling rate is further reduced from the reduced polling rate to a further reduced default rate, and the mobile wireless communications device 110 resumes polling for NFC devices at a further reduced default rate. However, when another NFC tag 120 is detected in response to polling at the reducing polling rate, the polling rate is set to the default polling rate and the mobile wireless communications device 110 resumes polling for NFC devices at the default rate after interacting with and deactivating the NFC tag 120. The mobile wireless communications device 110 may optionally delay the resumption of polling by a second delay. The second delay may be different than the first delay, for example, the second delay may be greater than the first delay.

When the detected NFC tag continues to be detected, the mobile wireless communications device 110 determines whether a current polling rate is greater than a minimum polling rate, and when the current polling rate is greater than the minimum polling rate, reduces the polling rate at periodic intervals until the minimum polling rate is reached, polls for NFC devices at the progressively lower polling rates.

It will be appreciated that when the NFC tag 120 remains in the operating field of the mobile wireless communications device 110, for example when the mobile wireless communications device 110 remains near or on the same NFC tag 120 for a long period of time, the NFC tag 120 is continually re-detected. This repeated re-detection of the same NFC tag 120 results in the NFC subsystem 272 of the mobile wireless communications device 110 unnecessarily drawing power.

The above-noted method problems a solution to the problem of re-detecting the same NFC tag, for example when the mobile wireless communications device 110 is sitting on an NFC tag, by using an algorithm to progressively reduce the rate at which polling for NFC technologies occurs after detecting a tag, thereby conserving power.

Figure 4B:
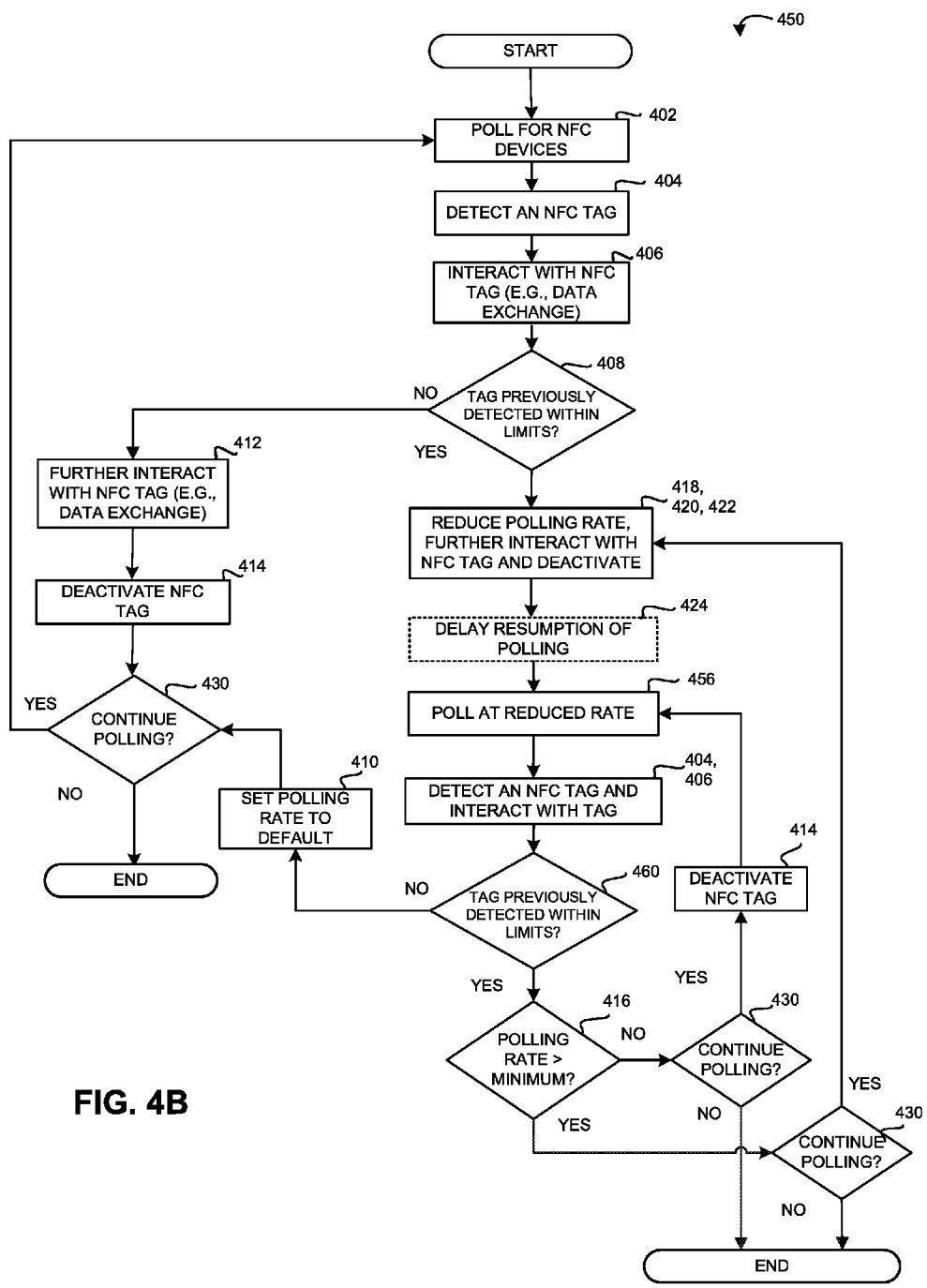

FIG. 4B illustrates a flowchart of a method 400 of efficient tag detection that may be used in the wireless communication system of FIG. 1 in accordance with another example embodiment of the present disclosure. The method 450 is similar to the method 400 with a few differences. Rather than setting the polling rate to the default polling rate whenever a new NFC tag 120 is detected, the polling rate is only reset to the default polling rate when a new NFC tag 120 is detected on subsequent iterations of the method 450 when polling at a reduced polling rate (block 456) after the same NFC tag has been repeatedly detected. Further, the minimum polling rate is only considered on subsequent iterations of the method 450 when polling at a reduced polling rate (block 456) after the same NFC tag has been repeatedly detected. Also, in some examples, when the mobile wireless communications device 110 resumes polling at the reduced polling rate, the thresholds used in 460 may be different. For example, the mobile wireless communications device 110 may determine whether the detected NFC tag 120 has been previously detected a second threshold number of times within a second threshold duration, as described above.

Figure 5:
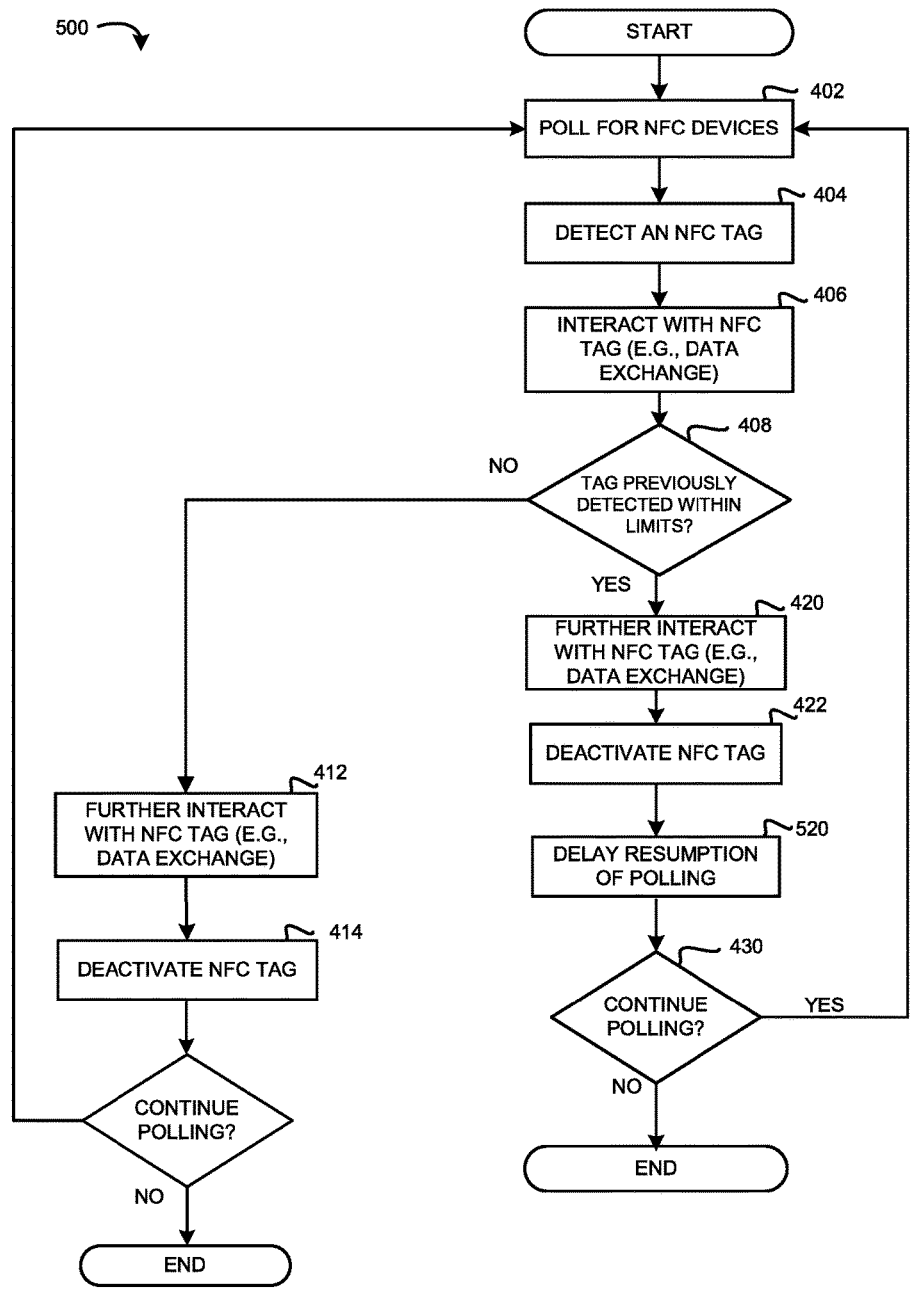

FIG. 5 illustrates a flowchart of a method 400 of efficient tag detection that may be used in the wireless communication system of FIG. 1 in accordance with another example embodiment of the present disclosure. The method 500 is similar to the method 400 except that the polling rate is not reduced. Instead, the mobile wireless communications device 110 delays the resumption of polling by a first delay, for example, by a few seconds, when the detected NFC tag 120 has been previously detected a threshold number of times within a first threshold.

In some examples, the delay before resuming polling may be changed when the detected NFC tag 120 is re-detected a second threshold number of times within a second threshold duration in response to polling at the default rate. For example, the mobile wireless communications device 110 may optionally delay the resumption of polling by a second delay when the detected NFC tag 120 is re-detected a second threshold number of times within a second threshold duration. The second delay may be different than the first delay, for example, the second delay may be different than the first delay.

Figure 6:
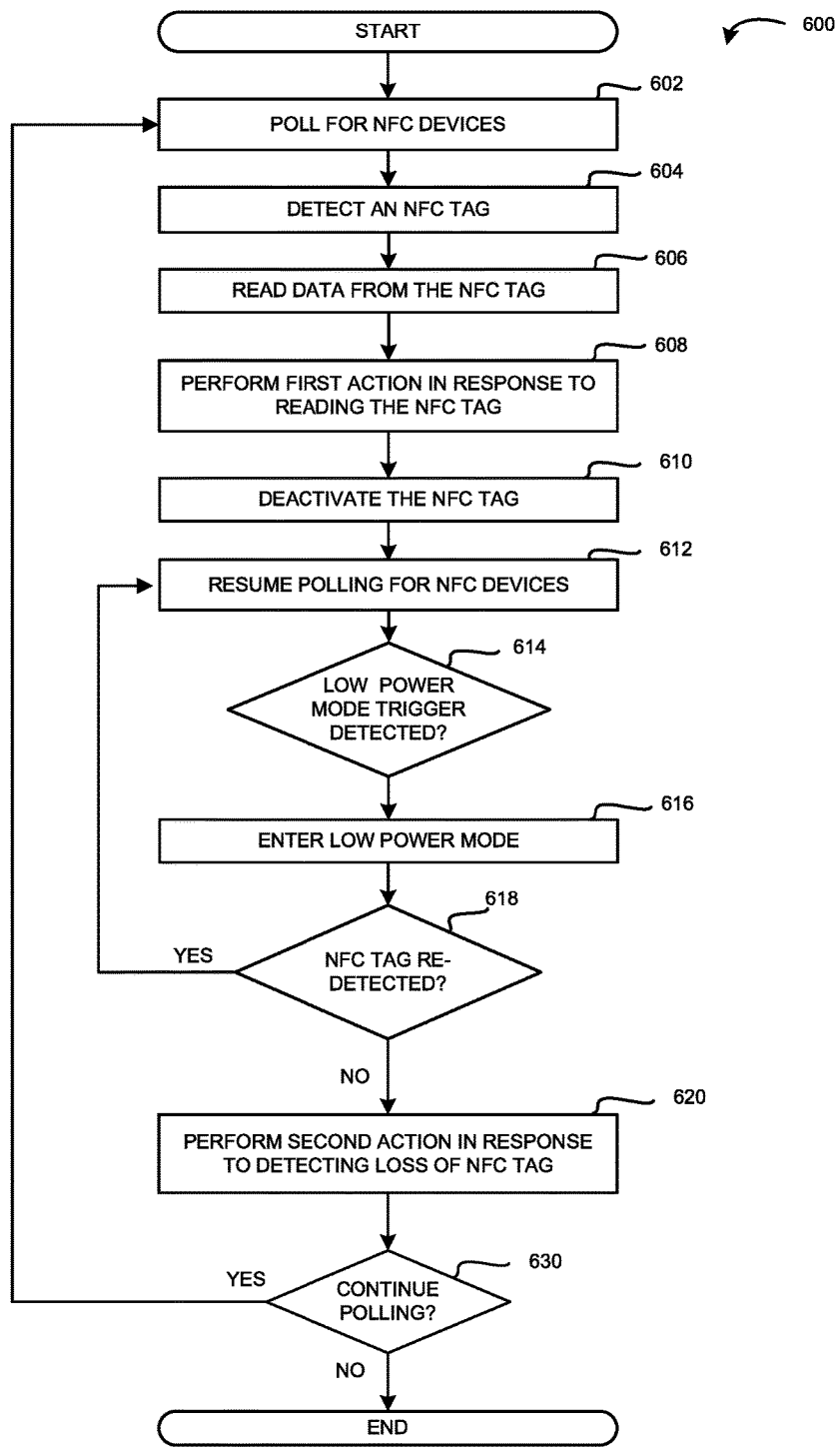
FIG. 6 is a flowchart illustrating a method of operating a mobile wireless communications device in the wireless communication system of FIG. 1 in accordance with an example embodiment of the present disclosure that may be used.

Reference is now made to FIG. 6 which illustrates a flowchart of a method 600 of operating a mobile wireless communications device in the wireless communication system of FIG. 1 in accordance with an example embodiment of the present disclosure that may be used. At 602, the mobile wireless communications device 110 commences polling for NFC devices in the operating field of the mobile wireless communications device 110, for example, by periodically sending a polling request frame via the NFC subsystem 272. At 604, the mobile wireless communications device 110 detects an NFC tag 120 when a polling response frame is received.

At 606, the mobile wireless communications device 110 reads with the detected NFC tags 120 using the modulation scheme, bit-level encoding, bit rate, and other parameters associated with the signaling technology of the detected NFC tag 120.

At 608, the mobile wireless communications device 110 performs a first action in response to the reading in accordance with the data read from the detected NFC tag 120, such as initiating a designated operating mode of the mobile wireless communications device 110 such as, for example, a bedside mode as described more fully below.

At 610, the NFC tag 120 is deactivated.

At 612, the mobile wireless communications device 110 resumes polling for NFC devices in the operating field of the mobile wireless communications device 110. In some examples, the mobile wireless communications device 110 only resumes polling for the NFC technology of the last detected NFC tag 120 rather than polling for all compatible NFC technologies (e.g., NFC-A, NFC-B and NFC-F). This reduces the polling time and may conserve power significantly.

The mobile wireless communications device 110 optionally monitors for one or more triggers for a low power mode. This may be part of a background process, for example, of the operating system 280 rather than the NFC communication module 288. The mobile wireless communications device 110 determines whether a trigger for a low power mode, such as inactivity (e.g., lack of received user input) which is greater than or equal to a threshold duration. When a trigger for a low power mode is detected, the low power mode is initiated. In some examples, a backlight of the display 212 may be deactivated The mobile wireless communications device 110 continues to poll for NFC devices in the low power mode and interact with detected NFC devices, such as the NFC tag.

At 618, the mobile wireless communications device 110 monitors for and detects a loss of the NFC tag 120 when the NFC tag 120 is not detected in response to the polling. To detect a loss of the NFC tag, the mobile wireless communications device 110 determines whether the NFC tag 120 is re-detected, for example, by determining whether a polling response frame is received from the previously detected NFC tag 120 using, for example, methods for determining whether an NFC tag 120 corresponds to a previously detected NFC tag described above. In other words, the mobile wireless communications device 110 determines a loss of the NFC tag 120 by the absence of a re-detection. From the loss of the NFC tag 120, the mobile wireless communications device 110 infers it has been removed from the NFC tag 120.

A delay (or timeout) may optionally be initiated between the initial detection and deactivation of the NFC tag 120 and monitoring for and detecting a loss of the NFC tag 120, to conserve power by avoiding unnecessary operations. The amount of the delay may be dependent on the first action that was performed. The delay could be an hour or more. For example, when the first action is initiation of a bedside mode, the delay could be several hours.

When the NFC tag 120 is re-detected, the operations return to 612 at which the mobile wireless communications device 110 resumes polling for NFC devices in the operating field of the mobile wireless communications device 110, in some examples mobile wireless communications device 110 only resumes polling for the NFC technology of the last detected NFC tag 120.

When the NFC tag 120 is not re-detected, the NFC tag 120 has been lost and operations proceed to 620 at which the mobile wireless communications device 110 performs a second action in response to detecting the loss of the NFC tag 120, such as terminating the designated operating mode of the mobile wireless communications device 110 (e.g., bedside mode) or changing the current operating mode from the designated operating mode to another operating mode (e.g., normal operating mode).

At 630, the mobile wireless communications device 110 may implicitly or explicitly determine whether polling should continue, for example, because the NFC mode on the mobile wireless communications device 110 is still active. This may be may be part of a background process, for example, of the operating system 280 rather than the NFC communication module 288. When it is determined to continue polling, the operations return to 602 and which the mobile wireless communications device 110 resumes polling for NFC technologies. When it is determined not to continue polling, the operations end.

The method 600 can be combined with one of the methods 400, 450 and 500 described above such that the mobile wireless communications device 110 re-detects the NFC tag 120 at a slower and slower rate, thereby saving power. Conventionally, polling for NFC only occurs in the full power mode (e.g., when the backlight of display 212 is on) to save power. However, the mobile wireless communications device 110 in some examples polls for NFC even in a low power mode (e.g. even when the backlight is off), thereby allowing NFC tag re-detection even in a low power mode. Additionally, the mobile wireless communications device 110 may could combine input from other sensors 268 (such as the accelerometer and/or motion sensor) to periodically monitor for and detect movement of the mobile wireless communications device 110 and trigger a NFC poll cycle or resuming polling at the default polling rate in response to the detecting notable movement of the mobile wireless communications device 110 (e.g., detected movement which exceeds a threshold). This allows the mobile wireless communications device 110 to re-detect the NFC tag 120 at a very slow rate while resting on or near the NFC tag 120 but quickly determine whether the NFC tag 120 is present or absent when the user picks up the mobile wireless communications device 110.

The method 600 provides a solution for determining when a mobile wireless communications device 110 has been moved away from an NFC tag which it was resting on or near and previously interacted with. Conventionally, there is no solution to this problem since the mobile wireless communications device 110 has already deactivated the NFC tag 120. The method 600 allows an application to know when the mobile wireless communications device 110 that has been left on a NFC tag and is later moved away from the NFC tag, and to trigger an action or event when that occurs. Moreover, the method can be implemented using existing NFC standards/specifications without hardware or firmware modifications.

Figure 7:
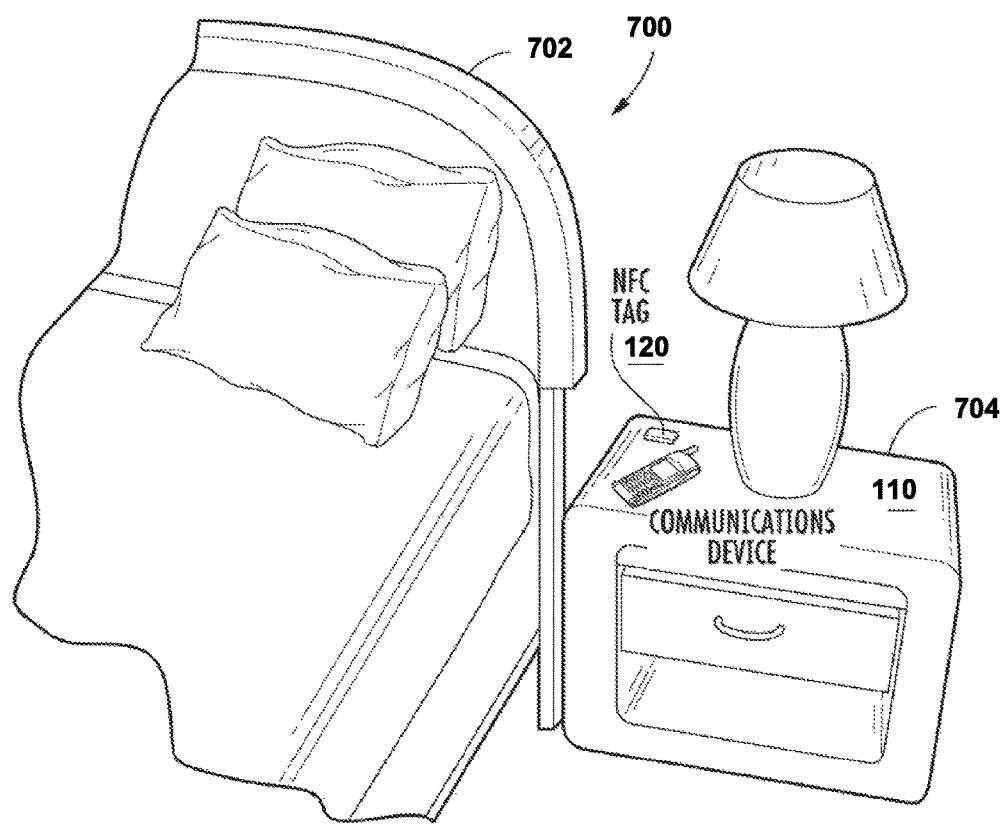
FIG. 7 is an isometric view of a portion of a living area showing a bed and nightstand and NFC tag and NFC-enabled mobile wireless communications device.

FIG. 7 illustrates a living area 700 that includes a bed 702 and nightstand 704. An NFC tag 120 is located on the nightstand 704. When a user sleeps at night, the user can place the mobile wireless communications device 110 onto the nightstand 704 near the NFC tag 120 such that the mobile wireless communications device 110 detects the NFC tag 120 and enables a bedside operating mode. The bedside operating mode may be a silent operating mode and/or locked operating mode. When a trigger for a notification is detected while the mobile wireless communications device 110 is in the bedside mode, such as if the mobile wireless communications device receives a phone call, the mobile wireless communications device 110 remains silent so that the user is not awoken.

In some examples, bedside mode disables all audible and/or haptic (or physical) notifications and outputs while the mobile wireless communications device 110 is in the bedside mode and possibly disabling some or all visual notifications and outputs, such as flashing an LED or displaying a notification on the display 212 of the mobile wireless communications device 110. In another example, the bedside mode may disable all audible and haptic notifications and outputs possibly visual notifications and outputs except for those associated with designated outputs, such as one or more designated alarms. This allows all notifications and outputs that may awake a user to be disabled except for any designated alarms that the user has enabled.

When a user wakes in the morning, the user picks up the mobile wireless communications device 110 from the nightstand 704 and the mobile wireless communications device 110 detects a loss of the NFC tag 120 and disables the bedside operating mode, for example, by resuming a normal operating mode or the previously active operating mode before the beside mode was enabled.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as a memory of the mobile wireless communications device 110.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of communication between a mobile wireless communications device and near field communication (NFC) devices, comprising:
    polling for NFC devices at a default rate;
    detecting a first NFC device in response to the polling at the default rate;
    when the first NFC device has been previously detected a first threshold number of times within a first threshold duration, polling for NFC devices at a reduced polling rate;
    when the first NFC device is re-detected a second threshold number of times within a second threshold duration in response to polling at the reducing polling rate, polling for NFC devices at a further reduced default rate;
    when a second NFC device is detected in response to polling at the reducing polling rate, resuming polling for NFC devices at the default rate after interacting with the NFC device.

2. The method of claim 1, wherein the reduced polling rate is less than the default polling rate, and the further reduced polling rate is less than the reduced polling rate.

3. The method of claim 1, further comprising:
    when the first NFC device was previously detected a first threshold number of times within a first threshold duration, delaying the resumption of polling by a first delay, wherein polling for NFC devices at the reduced polling rate is performed after the first delay.

4. The method of claim 3, further comprising:
    when the first NFC device is re-detected a second threshold number of times within a second threshold duration, delaying the resumption of polling by a second delay, wherein polling for NFC devices at the further reduced polling rate is performed after the second delay.

5. The method of claim 4, wherein the first delay and the second delay are the same.

6. The method of claim 1, further comprising:
    when the second NFC device is detected, resuming polling for NFC devices without delay after interacting with the NFC device.

7. The method of claim 1, further comprising:
    determining based on data received from the first NFC device whether the first NFC device corresponds to a previously detected NFC device.

8. The method of claim 1, further comprising:
    when the first NFC device continues to be detected and the current polling rate is greater than a minimum polling rate, polling for NFC devices at a progressively lower polling rates at periodic intervals until the minimum polling rate is reached.

9. The method of claim 1, wherein the first threshold number of times and the second threshold number of times is once.

10. A method of communication between a mobile wireless communications device and near field communication (NFC) devices, comprising:
    polling for NFC devices at a default rate;
    detecting an NFC device in response to the polling at the default rate;
    when the first NFC device has been previously detected a first threshold number of times within a first threshold duration, polling for NFC devices at a reduced polling rate;
    when the first NFC device was previously detected within the first threshold duration, changing the value of a polling rate stored in a memory of the mobile wireless communications device from the default polling rate to a reduced polling rate;
    when the first NFC device is re-detected a second threshold number of times within a second threshold duration, changing the value of the polling rate stored in the memory of the mobile wireless communications device from the reduced polling rate to the further reduced polling rate.

11. A mobile wireless communications device, comprising:
    a processor;
    a near field communication (NFC) subsystem for communicating with NFC devices; and
    a memory having stored thereon executable instructions that, when executed by the processor, configure the mobile wireless communications device to:
    poll for NFC devices at a default rate;
    detect an NFC device in response to the polling at the default rate;
    when the first NFC device has been previously detected a first threshold number of times within a first threshold duration, poll for NFC devices at a reduced polling rate;
    when the first NFC device is re-detected a second threshold number of times within a second threshold duration in response to polling at the reducing polling rate, poll for NFC devices at a further reduced default rate;
    when a second NFC device is detected in response to polling at the reducing polling rate, resume polling for NFC devices at the default rate after interacting with the NFC device.

12. The mobile wireless communications device of claim 11, wherein the reduced polling rate is less than the default polling rate, and the further reduced polling rate is less than the reduced polling rate.

13. The mobile wireless communications device of claim 11, wherein the executable instructions, when executed by the processor, configure the mobile wireless communications device to:
    when the first NFC device was previously detected a first threshold number of times within a first threshold duration, delay the resumption of polling by a first delay, wherein polling for NFC devices at the reduced polling rate is performed after the first delay.

14. The mobile wireless communications device of claim 13, wherein the executable instructions, when executed by the processor, configure the mobile wireless communications device to:
when the first NFC device is re-detected a second threshold number of times within a second threshold duration, delay the resumption of polling by a second delay, wherein polling for NFC devices at the further reduced polling rate is performed after the second delay.

15. The mobile wireless communications device of claim 11, wherein the executable instructions, when executed by the processor, configure the mobile wireless communications device to:
when the second NFC device is detected, resume polling for NFC devices without delay after interacting with the NFC device.

16. The mobile wireless communications device of claim 11, wherein the executable instructions, when executed by the processor, configure the mobile wireless communications device to:
when the first NFC device was previously detected within the first threshold duration, change the value of a polling rate stored in a memory of the mobile wireless communications device from the default polling rate to a reduced polling rate;
when the first NFC device is re-detected a second threshold number of times within a second threshold duration, change the value of the polling rate stored in the memory of the mobile wireless communications device from the reduced polling rate to the further reduced polling rate.

17. The mobile wireless communications device of claim 11, wherein the executable instructions, when executed by the processor, configure the mobile wireless communications device to:
when the first NFC device continues to be detected and the current polling rate is greater than a minimum polling rate, polling for NFC devices at a progressively lower polling rates at periodic intervals until the minimum polling rate is reached.

18. A non-transitory machine readable medium having tangibly stored thereon executable instructions for execution by a processor of a mobile wireless communications device, the mobile wireless communications device comprising a near field communication (NFC) subsystem for communicating with NFC devices, wherein the executable instructions, when executed by a processor of a mobile wireless communications device, cause the mobile wireless communications device to:
poll for NFC devices at a default rate;
detect an NFC device in response to the polling at the default rate;
when the first NFC device has been previously detected a first threshold number of times within a first threshold duration, poll for NFC devices at a reduced polling rate;
when the first NFC device is re-detected a second threshold number of times within a second threshold duration in response to polling at the reducing polling rate, polling for NFC devices at a further reduced default rate;
when a second NFC device is detected in response to polling at the reducing polling rate, resuming polling for NFC devices at the default rate after interacting with the NFC device.

19. A mobile wireless communications device, comprising:
a processor;
a near field communication (NFC) subsystem for communicating with NFC devices; and
a memory having stored thereon executable instructions that, when executed by the processor, configure the mobile wireless communications device to:
poll for NFC devices at a default rate;
detect an NFC device in response to the polling at the default rate;
when the first NFC device has been previously detected a first threshold number of times within a first threshold duration, poll for NFC devices at a reduced polling rate;
when the first NFC device was previously detected within the first threshold duration, changing the value of a polling rate stored in a memory of the mobile wireless communications device from the default polling rate to a reduced polling rate;
when the first NFC device is re-detected a second threshold number of times within a second threshold duration, changing the value of the polling rate stored in the memory of the mobile wireless communications device.

20. A non-transitory machine readable medium having tangibly stored thereon executable instructions for execution by a processor of a mobile wireless communications device, the mobile wireless communications device comprising a near field communication (NFC) subsystem for communicating with NFC devices, wherein the executable instructions, when executed by a processor of a mobile wireless communications device, cause the mobile wireless communications device to:
poll for NFC devices at a default rate;
detect an NFC device in response to the polling at the default rate;
when the first NFC device has been previously detected a first threshold number of times within a first threshold duration, poll for NFC devices at a reduced polling rate;
when the first NFC device was previously detected within the first threshold duration, changing the value of a polling rate stored in a memory of the mobile wireless communications device from the default polling rate to a reduced polling rate;
when the first NFC device is re-detected a second threshold number of times within a second threshold duration, changing the value of the polling rate stored in the memory of the mobile wireless communications device.

* * * * *